United States Patent Office 3,476,697
Patented Nov. 4, 1969

3,476,697
LINEAR POLYMERS WITH POLYFUNCTIONAL TELOMERS AND DERIVATIVES THEREOF
David H. Clements, Willow Grove, Pa., assignor to Rohm & Haas Company, Philadelphia, Pa., a corporation of Delaware
No Drawing. Filed May 28, 1965, Ser. No. 459,918
Int. Cl. C08g *30/14;* C07d *93/20*
U.S. Cl. 260—22     25 Claims

ABSTRACT OF THE DISCLOSURE

Products produced by reacting a linear polymer having a molecular weight of at least 200 and terminated at each end with OH, SH or $NH_2$ with a compound having from 3 to 6 carboxylic acid or phenolic hydroxyl radicals, at least one of the radicals being a carboxylic acid radical. These products, in turn, may be modified by reaction with ethyleneimine, an alkylene oxide or an episulfide or may be chain-extended by reaction with a difunctional reagent. Products are conventionally mixed with a cross-linker such as an epoxy resin, an aminoplast, an alkyd, a phenol-formaldehyde resin, a drying oil fatty acid, a diisocyanate, etc., and used as a coating composition. The products may also be used themselves in coating compositions, as adhesives, etc.

---

The present invention concerns novel compositions adapted to be used for coating and impregnating purposes and for use as intermediates in synthesizing a host of new compounds which in turn may be used as plasticizers, in protective coatings and in foams.

The oldest synthetic resins commercially used are condensation polymers. Both difunctional and polyfunctional reactants have been used in producing such polymers yielding products which are either thermoplastic or thermosetting at the choice of the formulator. Typical patents disclosing polyfunctional reactants in condensation polymers are U.S. Patent 2,683,131 to Cass, and U.S. 3,108,083 to Laganis. These patents exemplify polyfunctional polyesters prepared using a polybasic acid with a dihydric alcohol. As described by the patents, the desired amount of tribasic acid is admixed with a dibasic acid, and this mixture then esterified with the dihydric alcohol to yield a polyester having the desired degree of polyfunctionality. Such polymers are highly branched and the polyfunctionality is randomly distributed along the molecule of the polyesters so that when such a product is reacted with a cross-linking agent, as an epoxy resin or an aminoplast, cross-linking occurs between polymer molecules at a multiplicity of points along the molecules.

Polyfunctionality may also be introduced into polyester resins by using dibasic acids with a mixture of dihydric and tri- or tetrahydric alcohols. Upon cross-linking, the same type of structure is produced as in Cass and Laganis with the exception that the groups on the polymer through which cross-linking occurs are hydroxy groups.

Another class of commercially available, polyfunctional condensation polymers are the polyfunctional polyethers. Such products are prepared by reacting a polyhydric alcohol, as glycerol, trimethylolpropane, pentaerythritol, sorbitol, etc., with a desired amount of one or more alkylene oxides, particularly ethylene oxide and/or propylene oxide. Such polyethers are polyfunctional but also are highly branched in that a multiplicity of linear chains start from a single base molecule, each chain terminating in a single functional group. A similar group of thioethers terminating in mercapto groups is produced using ethylene sulfide in place of ethylene oxide.

Now, in accordance with the present invention, there has been discovered a broad class of condensation polymers which combine linearity with polyfunctionality, the polyfunctionality being limited to the ends of the polymer chains. Previously, the reaction of polyfunctional condensation polymers with cross-linking agents, such as aminoplasts, to yield coating compositions necessitated the formulator to choose between the properties of flexibility and toughness on the one hand, and hardness on the other in selecting the specific materials for the coating. This was due to the fact that in such prior art ploymers these two groups of properties appeared to be incompatible. It has now been found that coating compositions prepared with the linear condensation polymers of the invention are characterized by an unusual combination of exceptional hardness combined with excellent flexibility and toughness.

The novel polymers of the invention are prepared by reacting a linear polymer (termed a linear prepolymer herein) having a molecular weight of at least about 200 and terminated at each end by a carboxylic acid-reactive radical selected from the group consisting of OH, SH and $NH_2$ with a polyfunctional compound with a molecular weight of no more than 400 and having 3 to 6 reactive radicals selected from the group consisting of carboxylic acid groups and phenolic hydroxyl groups, at least one of the reactive radicals being a carboxylic acid group. It is understood, of course, that the carboxylic acid group may be either a free carboxylic acid group or a group which provides a carboxylic acid group during the reaction as, for example, an acid chloride or an acid anhydride, except that to minimize side reactions acid chlorides should not be used when the polyfunctional compound contains phenolic hydroxyls.

These linear polymers having terminal polyfunctionality possess the structure

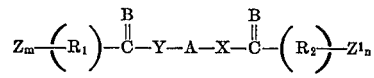

where X and Y are residues of groups reactive with a carboxylic acid radical and may be the same or different, A is a divalent polymeric organic radical having a molecular weight of at least about 200, B is oxygen or sulfur, Z and $Z^1$ are radicals selected from the group consisting of —COOH and phenolic OH and may be the same or different, $n$ and $m$ are integers having a value from 2 to 5 and may be the same or different, and $R_1$ and $R_2$ are nonpolymeric organic radicals having the radicals Z and $Z^1$ respectively attached thereto and may be the same or different.

THE LINEAR PREPOLYMERS

Linear prepolymers suitable for preparing the polymers of the invention are widely available commercially and their production does not constitute part of the instant invention. The preferred prepolymers have a softening point of no more than 85° C., and a molecular weight of at least 400. Linear, low molecular weight prepolymers of ethylene, propylene, etc. terminated at each end by an hydroxy group may be used, but by reason of their ready commercial availability and their physical and chemical properties, it is preferred to use a linear condensation prepolymer. As examples, such products may be produced by the condensation of one or more 1,2-alkylene oxides as ethylene oxide, propylene oxide, isobutylene oxide and styrene oxide with themselves or on a difunctional base compound as a glycol or a dithiol or a diphenol to produce a polyether chain terminated at each end with a hydroxy group. Similarly, linear condensation prepolymers may be produced using ethylene sulfide by itself or in admixture with one or more alkylene oxides. If it is desired to have an amine-terminated chain, one mole of ethyleneimine may be condensed at each end of a hydroxy or thiol-terminated chain, or, alternatively, monoethanolamine hydrochloride may be reacted with a carboxy-terminated chain.

Alternatively, linear condensation prepolymers are produced by condensing a dibasic acid with an excess of a glycol, an aminoalcohol, a mercaptoalcohol, a dithiol, a diamine or a mixture of two or more such compounds. A diphenol may also be used as described hereinafter. The dibasic acid may be saturated or unsaturated; and aliphatic, alicyclic, or aromatic and may include one or more hetero-atoms in the chain and/or ring. Dibasic acids which may be used include oxalic, succinic, glutaric, adipic, azelaic, sebacic, maleic, fumaric, glutaconic, α-hydromuconic, β-hydromuconic, phthalic, isophthalic, terephthalic, naphthalic, 1,4-cyclohexane-dicarboxylic, dinicotinic, acridinic, cinnamic, diglycolic, 3,3'-thiodipropionic, p-phenylenediacetic, the corresponding thiono- and thol-acids, etc. Mixtures of the acids with each other may be used. Suitable glycols include ethylene glycol, 1,2-propylene glycol, 1,3-propylene glycol, 1,3-butylene glycol, 1,4-butylene glycol, 1,6-hexanediol, 1,18-octadecanediol, 2,2,4-trimethylphentanediol, 1-butene-1,4-diol, 1,3-butadiene-1,4-diol, 2-hexene-1,6-diol, 2-butyne-1,4-diol, thiodiglycol, neopentyl glycol, diethylene glycol, 1,4-bis(hydroxymethyl)cyclohexane, 1,4 - bis(hydroxymethyl) benzene, etc. Dithiols which may be used include 1,2-ethane dithiol, 1,6-hexane dithiol, p-menthane dithiol, 2-butene-1,4-dithiol, 3-hexyne-1,6-dithiol, etc. Suitable diamines includes ethylenediamine, hexamethylenediamine, m-phenylenediamine, etc. Diphenols such as bisphenol A may also be used, in which case the dibasic acid must be used in a form suitable for reaction with the phenolic hydroxyl group, e.g. as the acid chloride. If desired, the difunctional compound to be reacted with the dibasic acid may possess two different reactive groups as an hydroxy group and an amino group, an hydroxy group and a thiol group or an amino group and a thiol group, e.g., mono-ethanolamine, 2-mercaptoethanol, etc. Mixtures of glycols, dithiols, diamines, etc. may be used—i.e. two or more glycols, or a glycol and a diamine, etc. The prepolymer produced in this way will consist of a linear chain terminated at each end by an OH, SH or NH$_2$ radical and the terminal radical may be the same or different at each end.

THE TELOMERIZING REACTION

The linear prepolymer is then reacted with a polyfunctional compound with a molecular weight of no more than 400 and having from 3 to 6 reactive radicals which may be either carboxylic acid groups or phenolic hydroxylic groups, at least one of which radicals is a carboxylic acid group to produce novel reaction products termed herein "polyfunctional linear polymers." Such polyfunctional compounds include the aromatic tricarboxylic acids, such as trimellitic, hemimellitic and trimesic acids, aromatic polycarboxylic acids, such as prehnitic, mellophanic, pyromellitic and mellitic acids; any of the tetracarboxylic acids described in U.S. 3,108,085 to Broadhead; aliphatic tricarboxylic acids, such as tricarballylic acid, aconitic acid, 1,1,5-pentanetricarboxylic acid, 1,2,4-hexanetricarboxylic acid and 5-octene-3,3,6-tricarboxylic acid; acids having phenolic hydroxyl groups, such as gallic, and protocatechuic acid; and aliphatic polycarboxylic acids, such as 3-hexene-2,2,3,4-tetracarboxylic acid. The aromatic tricarboxylic acids are particularly preferred. Mixtures of these acids with each other may also be used. It it also understood, as stated above, that the acid chlorides of these compounds and, where appropriate, the anhydrides of these compounds, may be used. When an acid having phenolic hydroxyl groups is used, due care must be used in selecting the reactants to assure that the acid reacts with the two terminal radicals of the linear polymer and not with itself. The phenolic hydroxyl group does not react with a free carboxylic acid group, but does react with an acid chloride group. Thus, acids such as gallic acid and protocatechuic acid should not be used in admixture with acid chlorides. When the prepolymer terminates in phenolic hydroxyl groups, there must be no hydroxyl groups on the polyfunctional compound.

The products of this telomerizing reaction will be linear condensation polymers possessing from two to five carboxylic acid and/or phenolic OH groups at each end, and only at the ends, of the polymer chains.

MODIFICATION OF POLYFUNCTIONAL LINEAR POLYMERS

The polyfunctional linear polymers of the present invention, produced as described, may be used directly in coating compositions or they may also be used as intermediates in synthesizing a host of new compounds having other desirable properties. Thus, the resins may be reacted with at least one compound having a 3-membered heterocyclic ring selected from the group consisting of the 1,2-alkylene oxides, ethyleneimine and ethylene sulfide to produce linear condensation polymers having two or more alcoholic hydroxy, amino and/or mercapto groups at each end of the polymer chain. Amine functionality can also be introduced using a monoalkanolamine hydrochloride; hydroxy functionality by using an excess of a glycol; etc.

Thus, according to the instant invention, there are produced linear condensation polymers having at the end of each polymeric chain, and only at the end, from two to five functional groups which, at the complete choice of the operator, can be carboxylic acid, phenolic hydroxyl, aloholic hydroxyl, amino, or mercapto or mixtures of such groups. Moreover, by selection of the reactants used in preparing the difunctional linear polymer and by regulation of the length of the polymer chains an extremely broad range of properties can be obtained in the final product.

For use in coating compositions, as a potting material, etc., the polyfunctional linear polymers of the invention are cross-linked by the use of di- or poly-functional reactants, including non-polymeric materials, such as dialdehydes, di- or polycarboxylic acids or acid anhydrides, diamines, diepoxides, di- or polyisocyanates, etc., and polymeric materials, such as aminoplasts, epoxy resins, phenol-formaldehyde resins, vinyl resins containing a plurality of reactive groups as a plurality of epoxy, aldehyde, amino, hydroxy and/or carboxylic acid groups, etc. Blends of non-polymeric materials, of polymeric materials, and of non-polymeric with polymeric materials may also be used. Further, it is often desirable to formulate blends of the products of the invention with a cross-linker and one or more modifying materials as an alkyd resin, non-reactive vinyl resin, a plasticizer, a flame-proofing material, etc., particularly to impart specific properties as flexibility, fire-resistance, etc.

When the polyfunctional telomer contains only two carboxylic acid groups and one or more phenolic hydroxyl groups, as in 2-hydroxyterephthalic acid, a difunctional reactant as a glycol may be used in a chain-extending reaction to produce a linear polymer possessing phenolic functionality only at the points where the polymer segments join and having polyfunctionality at the ends of the polymer chain which polyfunctionality will be phenolic hydroxyl and either alcoholic hydroxyl or carboxylic acid depending on the ratio of glycol to initial polymer. In the case of a hydroxyl-terminated polyester or polyether (A) reacted first with 2-hydroxy-terephthalic acid and then with ethylene glycol, the resulting chain-extended product would have the formula:

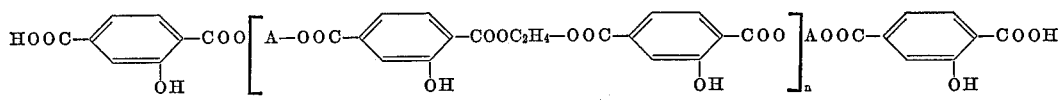

where $n$ is an integer. If an excess of glycol were used, the terminal —COOH groups would be replaced by —COOC$_2$H$_4$OH groups. Such chain-extended products may also be reacted with cross-linkers as described above. Such products may be used as fibers, films, coatings, foams, etc. and may be formulated to possess elasticity, if desired.

The nature of the functional groups determines the selection of the cross-linker. Thus, epoxy materials are generally used where the functional groups are carboxylic acid radicals, while aminoplasts are generally used where the functional groups are alcoholic hydroxy radicals. Diisocyanates and/or polyisocyanates can be used with products containing hydroxyl groups (whether phenolic or alcoholic), amino groups and mercapto groups to produce polyurethanes, polyureas, etc. useful as foams, coating compositions, etc. When the functional groups are hydroxyl (as when the prepolymer is reacted with trimellitic anhydride and this product is then reacted with ethylene oxide), the polyfunctional linear polymer may be reacted with a drying oil fatty acid as linolenic acid or a naturally occurring mixture as linseed oil to produce a curable coating composition.

Further, when the polyfunctional linear polymer terminates in amino groups (as by condensing ethyleneimine or a monoalkanolamine hydrochloride on the telomerized prepolymer as described above), the resulting product may be reacted with formaldehyde and an alcohol to produce polymers which may be blended with any one or more of an alkyd resin, a hydroxy-containing acrylic resin, and, optionally, with an aminoplast and/or epoxy resin to produce further novel coating compositions.

As can be seen from this description of the invention, the basic polymers of the invention, which are linear condensation polymer possessing polyfunctionality only at the ends of the polymer chains, constitute basic polymer building blocks which can be used in producing entirely new classes of compositions.

LINEAR CONDENSATION PREPOLYMERS

The preferred embodiment of the instant invention uses linear condensation prepolymers terminating in amino, mercapto and/or alcoholic hydroxyl groups. The polymers of this type which are most available commercially are the hydroxyl-terminated, both of the polyester and of the polyether type. The preparation of hydroxyl-terminated polyesters is well-known to the art and any of such known procedures may be used. In one method of preparation of these materials the dibasic acid and an excess of glycol or mixture of glycols are combined in a suitable reactor and heated to a temperature sufficient to promote the reaction. At this point, water is evolved. Provision is made to distill the water off and the temperature is slightly raised over a several hour period while distilling the water from the reaction until most of the theoretical water of reaction has been evolved. The pressure is then gradually reduced to about 50 to 100 mm. of mercury and held there until esterification of all the acid groups is essentially complete. The distillation temperature should be kept from rising to too high a value which would result in loss of glycol, particularly when boiling glycols, such as ethylene glycol, are used. This method gives a hydroxyl-terminated polyester containing a very low level of acid groups and essentially that amount of hydroxyl functionality which would be calculated from the amounts of reactants charged. It is obvious that it is not necessary to carry the reaction as near to completion as described in order to obtain useful materials. Since acid functionality is introduced later in the reaction, a few residual carboxyl groups would not detract greatly from most uses for which the final product is destined.

The preparation of linear polyethers and polythioethers is likewise conventional and will not be described here, such materials being available commercially from a variety of sources. Whichever type of prepolymer is used, it is preferred that it have a softening point of no more than 85° C. and a molecular weight of at least 400.

TELOMERIZATION

The reaction of the linear prepolymers terminated by carboxylic acid-reactive radicals with a polyfunctional compound is likewise a conventional esterification reaction. The reaction may be conducted in the absence of a solvent, but it is generally advantageous to use a solvent. In general, a suitable solvent is any inert material which is a liquid at the temperature of the reaction and which will dissolve both the linear prepolymer and the polyfunctional compound. In the case of a hydroxyl-terminated polyester prepolymer and trimellitic anhydride telomer, typical solvents which may be used include hydrocarbons such as benzene, toluene, xylenes and the like; chlorinated hydrocarbons such as chloroform, carbon tetrachloride, dichloroethane, trichloroethylene, perchloroethylene, and the like; ethers such as diethyl ether, dibutyl ether, ethylene glycol dimethyl ether, and the like; nitriles, such as acetonitrile, propionitrile and the like; amides, such as dimethylformamide, etc. The temperature of the reaction is not critical, though in practice low temperatures, such as room temperature, require impractically long periods of time for completing the reaction. Accordingly, for most reactions between the liinear prepolymer and the polyfunctional compound, temperatures above 100° C. are desirable. In the case of a hydroxyl-terminated polyester prepolymer and trimellitic anhydride telomer, a preferred range is from about 100° to about 200° C.

When the prepolymer terminates in phenolic hydroxyl groups, the telomer must contain no free phenolic groups and at least one of the carboxylic acid groups of the telomer must be in a form suitable for reaction with the phenolic hydroxyl, e.g. as the acid chloride.

Similarly, the reaction of the polyfunctional linear polymer with an alkylene oxide, alkylene imine and/or alkylene sulfide, involves merely conventional condensation reactions, the conditions for which are well-known to those skilled in the art. In the case of the reaction of the acid-terminated products with alkylene oxides, for example, it is desirable to use any of the several catalysts known to the art. Generally, these catalysts are bases, such as tertiary amines, for example, dimethylaniline; or alkali metal hydroxides, such as sodium hydroxide; or quaternary ammonium salts, such as trimethylbenzyl-ammonium bromide. Where the material to be treated is solid or viscous, it is advantageous to use a solvent. The only requirement for the solvent (other than that it be a solvent) is that it should not react with either the alkylene oxide or the polyfunctional linear polymer under the conditions used. Typical solvents possessing this property include the aromatic hydrocarbons, esters, ethers, nitriles and amides as listed above for the reaction between a hydroxyl-terminated polyester and trimellitic anhydride. The reaction proceeds at any temperature from about room temperature up to about 200° C. Preferably the reaction is carried out at about 50° to 150° C. At least a stoichiometric amount of the alkylene oxide should be used and preferably a slight excess, up to about 100% excess, should be used.

AMINOPLAST CROSS-LINKERS

When preparing coating compositions from the products of the invention containing alcoholic hydroxyl radicals as the terminal functional groups, it is preferred to use an alkylated aminoplast as the cross-linker. The alkylated aminoplasts which may be used include those obtained by the alkylation, with an alkanol having from 1 to 8 carbon atoms or furfuryl alcohol or cyclohexanol, of a condensate of an aldehyde with urea, N,N'-ethyleneurea, dicyandiamide, and aminotriazines. Both water-soluble and water-insoluble alkylated aminoplast condensates may be employed provided they are soluble in the organic solvent employed in making the coating compositions. Thus, such water-soluble condensates as the methylated dimethylolurea condensates can be employed provided the alkylation with methanol is sufficiently complete, and preferably substantially 100%, to render the alkylated condensate soluble in the organic solvents used in the coating compositions described herein. In general, the alkylated condensates should have at least 80% and preferably 100% of the methylol groups alkylated. Preferably, the alkylation products of alcohols having from 3 to 6 atoms are employed and the butylated products are particularly valuable because of their greater compatibility with a wide range of copolymers and solvents.

Among the aminotrizanes which are suitable are melamine, acetoguanamine, benzoguanamine, formoguanamine, N-(t-butyl)-melamine, N-(t-octyl)-melamine in which the t-octyl group has the formula:

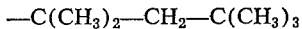

ammeline, 2-chloro-4,6-diamino-1,3,5-triazine, 2-phenyl-p-oxy-4,6-diamino-1,3,5 - triazine, 6-methyl-2,4 - diamino-1,3,5 - triazine, 2,4,6 - trihydrazine - 1,3,5 - triazine, 2,4,6 - triethyl - triamino - 1,3,5 - triazine, and the N,N-di($C_1$–$C_4$)alkyl melamines such as N,N-dimethylmelamine. While any aldehyde may be employed, such as acetaldehyde, crotonaldehyde, and acrolein, the condensates obtained using formaldehyde and revertible polymers thereof such as paraformaldehyde are preferably employed.

Generally, it is preferred to add an appropriate material to catalyze the reaction between the alkylated aminoplast and the alcoholic hydroxy groups of the polyfunctional linear polymer. The amount of such a catalyst may be from about 0.1 to 1% by weight, based on the weight of resin solids. The use of the curing catalyst may be particularly desirable when lower temperatures of curing or baking are needed. With such curing catalysts, insolubilization can be accomplished simply by drying and ageing at room temperature. Amongst the curing catalysts that may be used are any of the acid catalysts and, included in that group, are the organic and the inorganic acid catalysts. One may use, for instance, in catalytic amounts, sulfuric acid, hydrochloric acid and their acid salts, such as ammonium sulfate, ammonium chloride, other acid salts such as zinc perchlorate, etc. or the organic acids, such as acetic acid, phthalic acid, benzoic acid, toluene sulphonic acid, naphthalene sulphonic acid, and the monosalt of maleic acid with triethylamine.

The polyfunctional linear polymer and the aminoplast are dissolved in an organic solvent in the proportions of about 50 to 95 parts of the polymer to about 50 to 5 parts respectively of the aminoplast. The proportons in which any particular alklated aminoplast and any particular polyfunctional linear polymer are mixed must also be selected so as to provide compatibility of these two components in the coating solution as well as in the final film. Any suitable concentration of the polymer and aminoplast in the solvent may be employed such as from 1 to 50% by weight. If a pigment is present, the total solids concentration in the coating composition may be from 5 to 75% by weight. The ratio of pigment to binder (using the latter term to embrace the polymer and the aminoplast) may be from 1:20 to 20:1.

EPOXY CROSS-LINKERS

When preparing coating compositions from the products of the invention containing carboxylic acid groups as the terminal functional groups, it is preferred to use polyepoxides as the cross-linker. The polyepoxides contemplated are those which contain at least two epoxy groups, i.e. groups in which the oxygen is attached to adjacent carbon atoms connected together in a chain by a single valence bond. These epoxy groups may be termed vic-epoxy groups. The preferred polyepoxides are those which contain a terminal epoxy group of the formula:

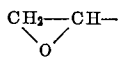

These resin-forming polyepoxides may be termed "ethoxyline" resins and are more particularly defined as organic compounds free of functional groups other than hydroxyl and epoxy groups which contain at least two vic-epoxy groups in which the oxygen is attached to adjacent singly-bonded carbon atoms and which have a molecular weight in the range of about 250 to 5,000. The polyepoxides having epoxy equivalencies from 100 to 1025 have generally been found to have satisfactory compatibility with the polyfunctional linear polymers herein defined. Those having greater epoxy equivalencies up to about 1,500 or higher are not generally compatible but may be used when special care is taken to select components of the polyfunctional linear polymer, as well as the proportions thereof relative to polyepoxide, to provide mutual compatibility.

Polyepoxides that may be used include glycol-bis-exo-dihydrodicyclopentadienyl ethers having the general formula:

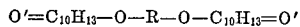

in which $C_{10}H_{13}$ is the radical of exo-dihydrodicyclopentadiene, the two O' groups are oxygen atoms which together with two adjacent carbon atoms in the $C_{10}H_{13}$ radicals form oxirane rings, and R is either (a) an alkylene group of 2 to 12 carbon atoms or (b) a radical of an etherified polyalkylene glycol, which radical has the formula (R'—O—)$_x$R' in which R' is an alkylene group of 2 to 4 carbon atoms and $x$ is an integer having a value of 1 to 8 inclusive. These compounds and their production are described in U.S. Patent No. 2,543,419.

There may also be used the "ethoxyline resins" available under the trade names of Epon or Araldite resins. They are polyether derivatives of a polyhydric phenol containing epoxy groups and may be prepared by effecting reaction between epichlorohydrin and a polyhydroxy phenol or alcohol, for example, hydroquinone, resorcinol, glycerine, or condensation products of phenols with ketones, for instance, bis-(4-dihydroxydiphenyl)-2,2-propane. These resins may be made by the method disclosed in U.S. Patents 2,324,483 and 2,444,333, British Patents 518,057 and 579,698. Data on the Epon resins are given in the table below:

TABLE I

| Epon No. | Epoxide, Equivalent | Approximate Esterification Equivalent | M.P., °C. |
|---|---|---|---|
| RN-34 | 225-290 | 105 | 20-28 |
| RN-48 | 192 | 80 | 9 |
| 1064 | 300-375 | 105 | 40-45 |
| 1062 | 140-165 | | Liquid |
| 1004 | 905-985 | 175 | 97-103 |
| 1001 | 450-525 | 130 | 64-76 |

Also, there may be used polyepoxides of the formula

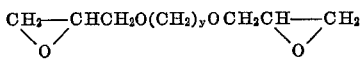

where $y$ is a number having an average value of 2 to 4. Epon 562 and Epon 828 are of this type, are liquid at normal room conditions and have "Epoxide Equivalent" values of 140-165 (Epon 562) and 190-210 (Epon 828) respectively. Also, a diepoxide or triepoxide of glycerol may be used. These aliphatic polyepoxides may be prepared in the known fashion as described, for example, in U.S. Patents 2,730,427 and 2,752,269. The preferred polyepoxides are those having an average molecular weight of about 250 to 1,000.

The polyfunctional linear polymer and the polyepoxide are dissolved in an organic solvent in the proportions of 50 to 95 parts of the polymer to 50 to 5 parts respectively of the polyepoxide. The proportions in which any particular polyepoxide and any particular polymer are mixed must also be selected so as to provide compatibility of these two components in the coating solution as well as in the final film.

Any suitable concentration of the mixture of the polymer and polyepoxide in the solvent may be employed such as from 1 to 50% by weight. If a pigment is present, the total solids concentration in the coating composition may be from 5 to 75% by weight. The ratio of pigment to binder (using the latter term to embrace the polymer and polyepoxide) may be from 1:20 to 20:1.

The polymer-aminoplast and the polymer-polyepoxide compositions herein described may each be combined with various modifiers as a phenol-formaldehyde resin, an alkyd resin, a vinyl-type resin (particularly one containing reactive groups as hydroxyl, carboxylic acid, amino, methylol-amino, etc.), etc. to impart desired properties to the composition.

Pigments suitable for use in preparing pigmented coating compositions using the products of the invention are inorganic pigments such as, for example, chrome yellows, Prussian blues and Brunswick greens, titanium pigments, such as titanium dioxide, extended titanium pigments (extended with either precipitated or natural extenders, such as alkali earth sulphates, for instance, calcium sulphate, barium sulphate, and the like), tinted titanium pigments, titanates, such as barium, lead, zinc, magnesium titanates, and the like. Additionally, other types of inorganic pigments might be included, such as zinc sulphide pigments, for instance, zinc sulphide, lithopone, other extended zinc sulphide pigments, such as calcium base lithopone, zinc sulphide extended with natural extenders, and the like, zinc oxide and antimony oxide, or organic pigments, that is organic coloring matters which are devoid of sulphonic, carboxylic, or other water-solubilizing groups. Also, for the purposes of this invention, we include within the term "pigment" other water-insoluble organic coloring matters, such as, for example, the calcium or barium lakes of azo lake dyestuffs.

The coating compositions prepared using products of the present invention are adapted to be applied in any suitable fashion to the substrate to be coated such as by brushing, spraying, dipping, roller coating or the like, then dried and finally cured by baking. The coating compositions may be applied to a wide variety of substrates, including paper, textiles, leather, wood, ceramics, brick, stone and concrete surfaces as well as metals. Such surfaces may be either primed or unprimed.

While the compositions of the invention are particularly described in coating compositions, they are not limited to such uses. Thus, they are also useful as binders for paper coating compositions, including papers useful in electrophotographic and electrolytic recording, as adhesives, as potting resins, as encapsulating resins, etc. Moreover, special compositions within the scope of the invention may be useful as films, fibers, foams and elastomeric materials.

The following examples illustrate the preparation of telomerized polymers according to the invention and the use of such materials with a variety of cross-linkers in a number of applications. Because of the scope of the instant invention, these examples necessarily are merely indicative of the nature of the invention and are not to be construed as limiting. All parts and percentages are by weight unless otherwise indicated and all viscosities are determined at 25° C.

EXAMPLE 1

Preparation of hydroxyl-terminated polyester

A mixture of 427.09 g. of 1,2-propyleneglycol, 358.46 g. of adipic acid and 407.49 g. of isophthalic acid is sparged with nitrogen and heated to 150° C. at which point water begins to distill. The temperature is gradually raised to 200° C. over about a four-hour period with continued distillation of water and the batch maintained under these conditions for 2 hours. The pressure is then gradually reduced following the following schedule—1 hour at 500 mm. of Hg, 1 hour at 350 mm. of Hg, 1 hour at 200 mm. of Hg, 1 hour at 100 mm. of Hg and 2½ hours at 50 mm. of Hg. The product thus produced weighs 1006 g., is a viscous gum at room temperature and has the following analysis:

| | |
|---|---|
| Viscosity (Gardner-Holt in 50% by weight ethylene dichloride) | A— |
| Color, as is | 1— |
| Acid number | 2.4 |
| Hydroxyl number | 63 |
| Iodine number | 0.3 |
| Saponification number | 556 |
| Molecular weight (ebulliometric) | 1495 |

Preparation of polycarboxylic acid-terminated resin

One hundred grams of the hydroxyl-terminated polyester produced above are heated to 150° C. and 23.66 grams of trimellitic anhydride are added. The mixture is maintained at this temperature with stirring for six hours, by which time the acid number has dropped to 97.2. Stirring and heating are then stopped and the product allowed to cool to room temperature. The product so produced is a brittle glass.

Coating

The acid-terminated polyester is then dissolved in Cellosole acetate to form a solution having 55% solids by weight. Sufficient solution to provide 75.5 parts solids basis of the resin is then blended with 24.5 parts of a commercial epoxy resin (available under the trademark Epon 828) and 1% tributyl amine catalyst. The solutions are coated on Bonderite 1000 panels and cured at 325° F. for 30 minutes to give a film thickness of 1.5 mils. The film so produced has the following properties: a pencil hardness of 2H (as measured by graphitic drawing pencils); a Knoop hardness number (KHN) of 13.2; the films show no cracking after bending around mandrels having diameters of ½, ¼ and ⅛" respectively; a reverse impact of 120-140 in./lb. (as measured by a Gardner Laboratory Impact Tester); soften to 6B and 6B pencil hardness after 15 minutes exposure to Cellosolve acetate and xylene, respectively; and show littlet ack when placed in contact wtih cheese cloth at 180° F. under a load of 2 p.s.i. for ½ hour. The film appears clear but slightly cratered.

EXAMPLES 2 THROUGH 8

A series of seven resinous compositions are prepared as in Example 1 varying only the nature and ratio of the reactants. The composition of the hydroxyl-terminated polyesters and their properties are set forth in Table II:

TABLE II

| | Charge | | | Properties of Product | | | | |
|---|---|---|---|---|---|---|---|---|
| No. | Glycol | Amount | Adipic | Isophthalic | Viscosity (Gardner-Holt) | Color (Gardner)[1] | Acid No. | Hydroxyl Number | Mol. Wt. (ebulliometric) |
| 2 | 1,2-propylene | 474.86 | 730.70 | | Z1– | 1– | 4.4 | 122 | 970 |
| 3 | do | 439.10 | 753.88 | | Z4+ | 1– | 5.6 | 58 | 1,515 |
| 4 | do | 427.09 | 358.46 | 407.49 | A–[2] | 1– | 3.9 | 67 | 1,440 |
| 5 | do | 449.13 | 345.56 | 392.83 | >Z–10 | 1– | 3.3 | 112 | 1,035 |
| 6 | do | 419.36 | 362.98 | 412.63 | | 2+ | 5.0 | 44 | 1,915 |
| 7 | Neopentyl | 1,031.14 | 632.36 | 718.86 | | | 6.3 | 55 | 1,615 |
| 8 | 1,3-butylene | 475.99 | 329.86 | 374.98 | >Z–10 | | 2.4 | 70 | |

[1] A.S.T.M. D-1544 63T.
[2] 50% solution in ethylene dichloride.

The hydroxy-terminated polyesters so produced are then reacted with trimellitic anhydride as described in Example 1. The amounts of the reactants and the acid numbers of the products are set forth in Table III:

TABLE III

| | Charge | | |
|---|---|---|---|
| Example | Polyester (g.) | Anhydride (g.) | Acid Number of Product |
| 2 | 100 | 46.35 | 185 |
| 3 | 100 | 29.37 | 134 |
| 4 | 987.6 | 263.9 | 117.0 |
| 5 | 100 | 41.25 | 164.8 |
| 6 | 500 | 96.17 | 87.2 |
| 7 | 1,000 | 188.35 | 92.8 |
| 8 | 442.0 | 116.48 | 122.2 |

EXAMPLE 9

A pressure vessel is charged with 400 grams of the trimellitic acid-terminated polyester produced in Example 4, 400 grams of toluene and 5.28 grams of a 50% aqueous solution of sodium hydroxide. The mixture is cooled in Dry Ice to —75° C., 46.0 grams of ethylene oxide are added and the vessel sealed. The reaction mixture is heated to 100° C. at which time the pressure in the vessel is 32 p.s.i.g. The temperature is maintained at 100° C. for 20.5 hours. At the end of this period, the pressure has fallen to 17.5 p.s.i.g. The reaction mixture is then allowed to cool to room temperature, is vented and the excess ethylene oxide and toluene distilled off, leaving 424 grams of product having an acid number of 6.7.

EXAMPLES 10 TO 14

A series of five polyhydroxy-terminated linear polymers are produced as in Example 9 varying only the nature and ratio of reactants and catalysts. The trimellitic acid-terminated polyester produced in Example 4 is used in Examples 10 through 12; that of Example 7 is used in Example 13; and that of Example 8 is used in Example 14. The following Table IV sets forth the amount of reactants, the catalyst and the properties of the products so produced:

TABLE IV

| | Charge | | | | | Product | | |
|---|---|---|---|---|---|---|---|---|
| Example No. | Amount of Acid-Terminated Resin, g. | Alkylene Oxide | Amount g. | Catalyst | Amount g. | Yield, g. | Acid No. |
| 10 | 50 | Ethylene oxide | 9.2 | Dimethylaniline | 0.1 | 54.8 | 0.6 |
| 11 | 50 | do | 5.75 | do | 0.1 | 54.0 | 5.6 |
| 12 | 50 | Propylene oxide | 7.58 | 25% NaOH | 0.12 | 54.5 | 10.0 |
| 13 | 50 | Ethylene oxide | 4.55 | 25% NaOH | 0.10 | 53.0 | 5.0 |
| 14 | 450 | do | 54.0 | 25% NaOH | 1.13 | 475.4 | 18.5 |

EXAMPLES 15 TO 18

One hundred and twenty-six parts of melamine and 486 parts of formalin (a 37% aqueous solution of formaldehyde) and 516 parts of n-butanol are introduced into a suitable reaction chamber equipped with thermometer, stirrer, reflux condenser, and a suitable water trap through which the reflux condensate passes on its return to the reaction chamber and in which the essentially aqueous fraction of the condensate may be separated from the essentially non-aqueous fraction. Means are provided so that the former reaction may be drawn off if desirable. The reaction mixture is refluxed to a temperature of about 91° to 93° C. at atmospheric pressure for 6 to 8 hours. The water is removed by azeotropic distillation from the reaction mixture during the reflux operation. The vapor temperature will be about 100° to 105° C. The pressure is lowered sufficiently to reduce the vapor temperature to about 85° to 90° C. and the resin solution is concentrated to about 50% solids by vacuum distillation.

A series of solutions are prepared each containing 60% solids and made up of 70 parts of a hydroxyethyl-terminated polyester, 30 parts of the melamine-formaldehyde resin described above, and 1% by weight of resin solids of the half triethylamine salt of maleic acid. The resulting solutions are coated on bonderized steel panels and the coatings cured by baking for 30 minutes at 300° F.

The following Table V sets forth the example describing the preparation of the hydroxyethyl-terminated polyester, the solvent used and the properties of the resulting films (CA is Cellosolve acetate and DMF is dimethylformamide):

TABLE V

| | Example Number | | | |
|---|---|---|---|---|
| | 15 | 16 | 17 | 18 |
| Preparation of Polyester— | | | | |
| | Example 9 | Ex. 10 | Ex. 11 | Ex. 14 |
| Solvent | | | | |
| | 3/1 mixture of n-butanol and CA | CA | CA | DMF |
| Thickness (mils) | 1.6 | 0.7-2.0 | 1.5 | 2.2 |
| Hardness (KHN) | 18.7 | 14.0 | 13.5 | 6.7 |
| Hardness (Pencil) | 4H | 3H | 3H | 2H |
| Flexibility (½", ¼", ⅛") | 0-0-0 | 0-0-0 | 0-0-0 | 0-0-0 |
| Reverse Impact (in.-lbs.) | 26 | 26 | 22 | 12 |
| Solvent Resist: | | | | |
| (15' CA) | 2H | 3H | 3H | 2H |
| (15' xylene) | 3H | 3H | 3H | 2H |
| Appearance | | (¹) | (¹) | OK |

[1] Sl. hazy cratering.

Films prepared exactly as described but baked for 30 minutes at 250° F. rather than 300° F. have similar properties except for slightly lower hardness (lower by 1 to 4 units KHN) and significant increases in reverse impact (higher by 20 to 30 in.-lb.).

EXAMPLES 19 and 20

Example 15 is repeated as Example 19 and Example 18 is repeated as Example 20 except that instead of the half triethylamine salt of maleic acid, the catalyst consists of 1% zinc perchlorate. The properties of the resulting films are set forth in the following Table VI:

TABLE VI

| Example No. | 19 | 20 |
|---|---|---|
| Thickness (mils) | 1.4 | 2.2 |
| Hardness (KHN) | 14.5 | 6.5 |
| Hardness (Pencil) | 6H | 2H |
| Flexibility, (½", ¼", ⅛") | 0-1-1 | 0-0-0 |
| Reverse Impact (in.-lb.) | 37 | 39 |
| Solvent Resist.: | | |
| (15' CA) | 2H | 2H |
| (15' xylene) | 3H | 2H |
| Print. Resist. (2 p.s.i., 180°, 30') | Trace | Light |
| Appearance | | OK |

EXAMPLES 21 and 22

In these examples, a pigmented coating composition is prepared by mixing 45 parts of rutile titanium dioxide with 55 parts of binder, the binder consisting of the resin-catalyst mixture from Example 19 being used for Example 21 and the resin-catalyst mixture from Example 20 being used for Example 22. The coating compositions have a viscosity of 18 seconds as determined on a No. 4 Ford cup. As in the previous examples, the films of the composition are cured by baking for 30 minutes at 300° F. The properties of the resulting pigmented films are set forth in the following Table VII:

TABLE VII

| Example No. | 21 | 22 |
|---|---|---|
| Thickness (mils) | 1.4 | 1.5 |
| Hardness (KHN) | 21.4 | 20.9 |
| Flexibility (½", ¼", ⅛") | 0-0-3 | 0-0-2 |
| Reverse Impact (in.-lb.) | 2 | <2 |
| Solvent Resist.: | | |
| (15' CA) | 5H | 3H |
| (15' xylene) | 5H | 5H |
| Print Resist. (2 p.s.i., 180°, 30') | Completely resistant. | Completely resistant. |
| Gloss (60°) | 100 | 78. |
| Color | 6.8 | 7.8. |
| Acid Resist. (N/2 HCl, 16 hr.) | Med. blister | Bad blister. |
| Base Resist. (N/2 NaOH, 16 hr.) | OK | Light spot. |
| Tide Resist. (1%, 165° F.):* | | |
| 24 hr | 4-med.-dense | 2-medium. |
| 120 hr | Peeled | Peeled. |
| Hardness, Pencil | 6H | 5H. |

\* A.S.T.M. Designation: D 714-56.

EXAMPLES 23 to 25

A series of solutions are prepared each containing 55% solids in Cellosolve acetate and made up of a trimellitic acid-capped polyester and an epoxy resin (in this case Epon 828) on a 1:1 equivalent basis with 1% (based on total solids) of tributylamine catalyst. The resulting solutions are coated on panels of Bonderite 1000 coated steel and the coatings cured by baking for 30 minutes at 325° F. The following Table VIII sets forth the example describing the preparation of trimellitic acid-capped polyesters and the properties of the resulting films:

TABLE VIII

| | Example Number | | |
|---|---|---|---|
| | 23 | 24 | 25 |
| System | | | |
| | Ex. 2 (61.5)/ Epon 828 (38.5) | Ex. 3 (69)/ Epon 828 (31) | Ex. 5 (64.3)/ Epon 828 (35.7) |
| Hardness: | | | |
| KHN | 3.5 | Tacky | 15.7 |
| Pencil | H | F | 2H+ |
| Flexibility (½", ¼", ⅛") | 0-0-0 | 0-0-0 | 0-0-0 |
| Reverse Impact (in.-lbs.) | 120-140 | 140 | 120 |
| Solvent Resistance: | | | |
| CA (15 min.) | 6B | 6B | 6B |
| Xylene (15 min.) | 6B | 6B | H |
| Print Resistance (180° F., 2 p.s.i., ½ hour) | Trace | Trace | Trace |
| Film Appearance | (¹) | (¹) | (¹) |

¹ Clear and cratered.

After the reverse impact test, the films of Examples 23 and 24 showed cracks in the impacted area after being heated for 15 minutes at 140° F.

EXAMPLE 26

In this example, a pigmented coating composition is prepared by mixing 45 parts of rutile titanium dioxide with 55 parts of the resin-catalyst mixture used in Example 25. The coating composition has a viscosity of 60 seconds as determined on a No. 4 Ford cup. As in the previous examples, the film is coated on panels of Bonderite 1000 coated steel and cured by baking for 30 minutes at 325° F. The properties of the resulting pigmented film are set forth in the following Table IX:

Table IX

| | |
|---|---|
| Hardness: | |
| KHN | 26.3 |
| Pencil | 3H |
| Flexibility (½", ¼", ⅛") | 0-0-0 |
| Reverse impact (in.-lbs.) | 18 |
| Solvent resistance: | |
| CA (15 min.) | 6B |
| Xylene (15 min.) | 2H |
| Stain resistance: | |
| Ink (30 min.) | Trace |
| Mustard (30 min.) | No stain |
| Gloss 60° | 52 |
| Tide resistance, 1% at 165° F.: | |
| 72 hours | OK |
| 300 hours | Eroded |

EXAMPLES 27 to 29

In these examples, three pigmented coating compositions are prepared by mixing 45 parts of rutile titanium dioxide with 55 parts of binder as in Example 26. In each case, the trimellitic acid-capped polyester used is the one described in Example 6. The epoxy resin is varied in each case, the molecular weight of the epoxy increasing in sequence from Examples 27 to 29. In each case, the epoxy is added in a 1:1 equivalent basis with the trimellitic acid-capped polyester. As in the previous examples, the films of the compositions are coated on panels of Bonderite 1000 coated steel and cured by baking for 30 minutes at 325° F. The properties of the resulting pigmented films are set forth in the following Table X:

TABLE X

| | Example Number | | |
|---|---|---|---|
| | 27 | 28 | 29 |
| | System | | |
| | Ex. 6 | Ex. 6 | Ex. 6 |
| | (77.2)/ Epon 826 (22.8) | (77.4)/ Epon 828 (22.6) | (55.9) Epon 1001 (44.1) |
| Hardness: | | | |
| KHN | 7.0 | 7.8 | 20.4 |
| Pencil | 2H | 2H | 2H |
| Flexibility (½", ¼", ⅛") | 0-0-0 | 0-0-0 | 0-0-0 |
| Reverse Impact (in.-lbs.) | 110 | 130 | 8 |
| Solvent Resistance: | | | |
| CA (15 min.) | 6B | 6B | 6B |
| Xylene (15 min.) | 6B | 6B | 4B |
| Optical Properties: | | | |
| 20° Gloss | 13 | 6 | 12 |
| 60° Gloss | 57 | 44 | 50 |

EXAMPLES 30 TO 31

In these examples, Example 28 is repeated with the exception that the catalyst is varied in each of the examples. In each case, the catalyst concentration is 1% based on binder solids. The nature of the catalyst and the properties of the resulting pigmented films are set forth in the following Table XI:

TABLE XI

| | Example Number | |
|---|---|---|
| | 30 | 31 |
| | Catalyst | |
| | Tributylamine | Tridimethyl amino methyl phenol |
| Hardness: | | |
| KHN | 7.1 | 11.4 |
| Pencil | 2H | 2H |
| Flexibility (½", ¼", ⅛") | 0-0-0 | 0-0-0 |
| Reverse Impact (in.-lbs.) | 110 | 90-110 |
| Solvent Resistance: | | |
| CA (15 min.) | 6B | 6B |
| Xylene (15 min.) | 5B | 3B |
| Print Resistance: 180° F., 2 p.s.i., ½ hour | Trace | Trace |
| Stain Resistance: | | |
| Inn (30 min.) | Etched | Etched |
| Mustard (30 min.) | Trace | Trace |
| Film Appearance: Bonderite 1000 | (¹) | (²) |
| Optical Properties: | | |
| 20° Gloss | 17 | 46 |
| 60° Gloss | 52 | 76 |
| Color | 6.8 | 9.4 |
| Overbake Gloss: 350° F., 16 hours, 60° | 49 | 70 |
| Overbake Color: | | |
| 400° F., 30', 60° | 9.1 | 18.7 |
| 350° F., 16 hours, 60° | 11.3 | 32.3 |

¹ Cratered and hazy.
² Smooth and hazy.

EXAMPLES 32 TO 35

A poly(ethylene oxide) obtained under the trade name Carbowax 400 is reacted with methyl diethanolamine and adipic acid to produce a hydroxyl-terminated adduct believed to have the following structure:

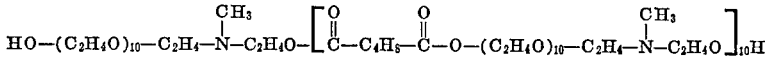

This adduct is then reacted with trimellitic anhydride as described in Example 1 to produce a trimellitic acid condensate. A series of aqueous baths each containing about 8% solids are then made up using the condensate and an epoxy resin available under the trademark Eponite 100.

Squares of undyed fabric made from a polyester fiber (the polyester is available under the trademark Dacron) are first scoured in a home washing machine containing 16 gallons of tap water and 6 grams of a non-ionic surfactant (the 10 mol ethylene oxide adduct of octyl phenol) for 20 minutes and rinsed automatically. The fabrics are then rinsed again for 20 minutes in the same washer. The squares of fabric are then padded with the aqueous bath to obtain a pickup of about 3% solids on the fiber. The fabrics are then heated 5 minutes at 300° F. Samples of the treated fabric are then washed in a home washing machine containing 16 gallons of tap water, 25 grams of a commercial detergent (available under the trademark Tide) and 10 cotton towels for 20 minutes and rinsed automatically. The samples are then dried and conditioned at 65% relative humidity and 70° F. The electrical resistivity of the treated samples is then measured by AATC test Method 76–1959 and an electrometer Model 610A coupled to a resistivity adaptor Model 6105 made by Keithly Instruments, Inc. The applied voltage to the adaptor is set at 95 volts.

Samples of the treated fabric are also subjected to the drycleaning procedure described in U.S. Patent 3,021,232. The drycleaning solution consists of 30 parts by volume perchloroethylene, 2.1 parts by volume drycleaning soap (RR Street's 886) and 0.2 part by volume tap water. The samples are shaken in this solution on a reciprocal shaker for 25 minutes at room temperature, then placed in perchloroethylene and shaken an additional 5 minutes at room temperature. The samples are finally rinsed in deionized water, dried, conditioned at 65% R.H. and 70° F. and their resistivity measured as above.

The whiteness of the fabric samples is determined on a Photovolt Model 610 reflectometer equipped with a blue filter. The reflectometer is calibrated so that a reading of 100% is obtained from a magnesium oxide standard and the whiteness of the fabric is given as a fraction of the whiteness of this standard.

The compositions of the padding baths are set forth in Table XII, the antistatic properties of the fabric samples along with that of untreated cotton and Dacron controls, all expressed as log R, are set forth in Table XIII, and the whiteness of the fabric samples is set forth in Table XIV:

TABLE XII

| Example No. | Trimellitic Acid-Condensate 20% solids in water (g.) | Eponite 100 | | | Polymer on fabric (percent) |
|---|---|---|---|---|---|
| | | H₂O (g.) | 100% (g.) | (Percent on polymer solids) | |
| 32 | 40.0 | 60.0 | | 0 | 3.1 |
| 33 | 39.25 | 60.36 | 0.39 | 5 | 2.7 |
| 34 | 36.25 | 63.03 | 0.725 | 10 | 2.8 |
| 35 | 33.38 | 65.29 | 1.34 | 20 | 3.2 |

TABLE XIII

| Example No. | Before Washing or drycleaning | After Washing Cycle | | | Drycleaning Cycle, No. 5 |
|---|---|---|---|---|---|
| | | No. 1 | No. 5 | No. 10 | |
| 32 | 11.3 | 14.4 | 12.1 | 15.6 | 15.4 |
| 33 | 11.6 | 13.7 | 14.2 | 15.2 | 15.0 |
| 34 | 12.0 | 13.0 | 15.1 | 15.1 | 13.5 |
| 35 | 12.1 | 11.7 | 12.4 | 12.3 | 12.4 |
| Cotton | 11.4–12.4 | No change | | | |
| Dacron control | 16–17 | No change | | | |

TABLE XIV

| Example No. | Before Washing or drycleaning | After Washing Cycle | | | After drycleaning Cycle, No. 5 |
|---|---|---|---|---|---|
| | | No. 1 | No. 5 | No. 10 | |
| 32 | 80.4 | 83.4 | 83.0 | 82.0 | 82.4 |
| 33 | 81.6 | 82.8 | 83.0 | 82.6 | 82.4 |
| 34 | 81.6 | 83.0 | 83.4 | 82.0 | 81.8 |
| 35 | 81.8 | 81.4 | 83.4 | 80.0 | 76.0 |

EXAMPLE 36

A mixture of 125 g. of a polypropylene glycol (having a molecular weight of about 400 and obtained under the trademark Niax PPG-425) and 109.9 g. of trimellitic anhydride are heated at 160° C. for 2 hours. On cooling, the product solidifies. The acid number of the product is 245.3.

A mixture of 5 g. of this product, 4.37 g. of a polyepoxide (Epon 828) and 0.05 g. of tri-n-butylamine is dissolved in 5 g. of Cellosolve acetate. The solution is coated on glass, air-dried for two hours and baked at 150° C. for one-half hour. The resulting film is clear, very tough and has very good adhesion to glass.

What is claimed is:

1. A linear polymer with terminal polyfunctionality possessing the structure $$Z_m{-}(R^1){-}\overset{C}{\underset{\parallel}{C}}{-}Y{-}A{-}X{-}\overset{B}{\underset{\parallel}{C}}{-}(R^2){-}Z^1{}_n$$

where
  X and Y are O, S or NH, A is a divalent linear organic polyester radical having a molecular weight of at least 400 and free of active hydrogen and groups reactive with active hydrogen,
  B is oxygen or sulfur,
  Z and $Z^1$ are radicals selected from the group consisting of —COOH and phenolic OH,
  n and m are integers having a value from 2 to 5, and
  $R^1$ and $R^2$ are either aliphatic or aromatic radicals having the radicals Z and $Z^1$ respectively attached thereto, which, together with said respective radicals, each have a molecular weight of no more than 355.

2. A linear polymer according to claim 1 wherein $R^1$ and $R^2$ are monoaromatic radicals.

3. A linear polymer according to claim 4 wherein Z and $Z^1$ are COOH.

4. A linear polymer according to claim 1, wherein polyester A has a molecular weight of at least about 970.

5. A linear polymer according to claim 4, wherein polyester A is a condensate of adipic acid or a mixture of adipic and isophthalic acids, with a glycol.

6. A linear polymer according to claim 1 wherein A is the residue of a polyester having a softening point of no more than 85° C., B is oxygen, $R^1$ and $R^2$ are monoaromatic radicals and Z and $Z^1$ are COOH.

7. A linear polymer according to claim 1 possessing the structure $$\underset{\underset{COOH}{|}}{\text{HOOC}}\text{-}\underset{}{\bigcirc}\text{-}\overset{O}{\underset{\parallel}{C}}\text{-}O\text{-}A\text{-}O\text{-}\overset{O}{\underset{\parallel}{C}}\text{-}\underset{\underset{COOH}{|}}{\bigcirc}\text{-COOH}$$

where A is the residue of a hydroxyl-terminated linear polyester.

8. A linear polymer possessing the structure $$\underset{\underset{COOH}{|}}{\text{HOOC}}\text{-}\underset{}{\bigcirc}\text{-}\overset{O}{\underset{\parallel}{C}}\text{-}O\text{-}A\text{-}O\text{-}\overset{O}{\underset{\parallel}{C}}\text{-}\underset{\underset{COOH}{|}}{\bigcirc}\text{-COOH}$$

where A is the residue of a linear polyether having a molecular weight of at least about 200, said residue being free of active hydrogen and groups reactive with active hydrogen.

9. A linear polymer having the formula $$Z_m{-}(R^1){-}\overset{O}{\underset{\parallel}{C}}{-}O{-}A{-}O{-}\overset{O}{\underset{\parallel}{C}}{-}(R^2){-}Z^1{}_n$$

where:
  A is a divalent linear organic polyester radical having a molecular weight of at least 400 and being free of active hydrogen and groups reactive with active hydrogen,
  Z and $Z^1$ are radcals selected from the group consisting of —COOH and phenolic OH,
  n and m are integers having a value from 2–5, and
  $R^1$ and $R^2$ are either aliphatic or aromatic radicals having the radicals Z and $Z^1$ respectively attached thereto, which, togteher with said respective radicals, each have a molecular weight of no more than 355.

10. A composition comprising a compatible mixture of
  (a) the linear polymer of claim 1, and
  (b) a cross-linking agent containing at least two groups reactive with Z and $Z^1$.

11. A composition comprising a compatible mixture of
  (a) the linear polymer of claim 5, and
  (b) a cross-linking agent containing at least two groups reactive with COOH.

12. A composition according to claim 11 wherein the cross-linking agent contains at least 2 epoxy groups.

13. A linear polymer with terminal polyfunctionality possessing the structure $$\begin{array}{c}(DO)_p \\ (DO-C)_q \\ \parallel \\ O\end{array}(R^1)-\overset{B}{\underset{\parallel}{C}}-Y-A-X-\overset{B}{\underset{\parallel}{C}}-(R^2)\begin{array}{c}(OD)_p \\ (C-OD)_q \\ \parallel \\ O\end{array}$$

where:
  X and Y are O, S or NH, A is a divalent linear polymeric organic radical having a molecular weight of at least about 200 and free of active hydrogen and groups reactive with active hydrogen,
  B is oxygen or sulfur,
  D is selected from the group consisting of hydroxyalkyl, mercaptoalkyl, aminoalkyl, and may be the same or different in its several occurrences,
  p and q are integers having a value from 0 to 5 and the sum of p and q is an integer from 2 to 5, and
  $R^1$ and $R^2$ are aliphaitc or aromatic radicals, having the radicals $$(DO)_p \text{ and } (DO-\overset{O}{\underset{\parallel}{C}})_q$$

attached thereto, which, together with said respective radicals, each have a molecular weight of no more than 355.

14. A linear polymer according to claim 13 wherein D is selected from the group consisting of hydroxyethyl and hydroxypropyl.

15. A composition comprising a compatible mixture of
  (a) the linear polymer of claim 13, and
  (b) a cross-linking agent containing at least two groups reactive with the groups attached to D.

16. A linear polymer according to claim 13 wherein D is selected from the group consisting of hydroxyethyl and hydroxypropyl and p is zero.

17. A composition comprising a compatible mixture of
  (a) the linear polymer of claim 16, and
  (b) at least one drying oil fatty acid.

18. A composition comprising a compatible mixture of
  (a) the linear polymer of claim 16, and
  (b) a cross-linking agent containing at least two groups reactive with alcoholic hydroxyl groups.

19. A composition comprising a compatible mixture of
  (a) the linear polymer of claim 16, and
  (b) an aminoplast.

20. A composition comprising a compatible mixture of
  (a) the linear polymer of claim 16, and
  (b) an isocyanato compound containing at least two isocyanato groups.

21. A linear polymer possessing the structure

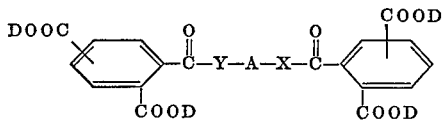

where:
A is a linear divalent polymeric organic radical having a molecular weight of at least 200 and free of active hydrogen and groups reactive with active hydrogen,
X and Y are O, S or NH, and
D is selected from the group consisting of hydroxyalkyl, mercaptoalkyl, aminoalkyl, and may be the same or different in its several occurrences.

22. A linear polymer according to claim 21 wherein D is selected from the group consisting of —CH$_2$CH$_2$OH, —CH$_2$CHOHCH$_3$, and —CH$_2$CH$_2$CH$_2$OH.

23. A linear polymer which is the reaction product of:
(a) a difunctional compound selected from the group consisting of glycols, organic diamines, aminoalcohols and mixtures thereof with each other, and
(b) a compound possessing the structure

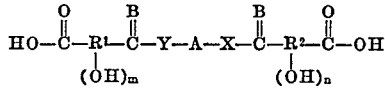

where:
X and Y are O, S or NH,
A is a divalent linear polymeric organic radical having a molecular weight of at least about 200 and free of active hydrogen and groups reactive with active hydrogen,
B is oxygen or sulfur, R$^1$ and R$^2$ are aromatic radicals having no more than two rings,
$m$ and $n$ are integers having a value from 1 to 4.

24. A composition comprising a compatible mixture of
(a) the linear polymer of claim 23 and
(b) a cross-linking agent containing at least two groups reactive with the active hydrogen groups on the polymer of claim 23.

25. A linear polymer according to claim 23 wherein the difunctional compound is a glycol.

References Cited

UNITED STATES PATENTS

| | | | |
|---|---|---|---|
| 3,182,073 | 5/1965 | Loncrini | 260—75 |
| 3,288,759 | 11/1966 | Holub et al. | 260—75 |
| 3,329,739 | 7/1967 | Semroc | 260—835 |
| 2,591,539 | 4/1952 | Greenlee | 260—835 |
| 2,683,131 | 7/1954 | Cass | 260—835 |
| 2,891,034 | 6/1959 | Fisch | 260—835 |
| 3,062,770 | 11/1962 | Hirsch et al. | 260—835 |
| 3,280,077 | 10/1966 | Case et al. | 260—835 |

FOREIGN PATENTS 735,531  8/1955  Great Britain.

OTHER REFERENCES

Ward et al., I & E.C. Product Research and Development, vol. 2, No. 2, June 1963, pp. 85–96.

DONALD E. CZAJA, Primary Examiner

R. W. GRIFFIN, Assistant Examiner

U.S. Cl. X.R.

117—124, 132, 139.5, 161, 167; 260—2.5, 33.2, 33.4, 38 39, 40, 75, 835, 842, 850, 858, 860, 873

UNITED STATES PATENT OFFICE
CERTIFICATE OF CORRECTION

Patent No. 3,476,697 November 4, 1969

David H. Clemens

It is certified that error appears in the above identified patent and that said Letters Patent are hereby corrected as shown below:

In the heading to the printed specification, line 4, "David H. Clements" should read -- David H. Clemens --.

Signed and sealed this 20th day of October 1970.

(SEAL)
Attest:

Edward M. Fletcher, Jr.
Attesting Officer

WILLIAM E. SCHUYLER, JR.
Commissioner of Patents